United States Patent
Lee et al.

(10) Patent No.: US 8,626,489 B2
(45) Date of Patent: Jan. 7, 2014

(54) METHOD AND APPARATUS FOR PROCESSING DATA

(75) Inventors: Dong Yeol Lee, Suwon-si (KR); Seung Seop Park, Seoul (KR); Jae Hyun Ahn, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 431 days.

(21) Appl. No.: 12/754,180

(22) Filed: Apr. 5, 2010

(65) Prior Publication Data

US 2011/0046943 A1 Feb. 24, 2011

(30) Foreign Application Priority Data

Aug. 19, 2009 (KR) .................. 10-2009-0076556

(51) Int. Cl.
*G06F 17/27* (2006.01)
(52) U.S. Cl.
USPC ............ 704/9; 704/7; 704/10; 704/257
(58) Field of Classification Search
None
See application file for complete search history.

(56) References Cited

U.S. PATENT DOCUMENTS

| | | | | |
|---|---|---|---|---|
| 5,676,551 | A | * | 10/1997 | Knight et al. ................ 434/236 |
| 5,860,064 | A | * | 1/1999 | Henton ........................ 704/260 |
| 2003/0028380 | A1 | * | 2/2003 | Freeland et al. ............. 704/260 |
| 2004/0199923 | A1 | * | 10/2004 | Russek ........................ 719/310 |
| 2004/0267816 | A1 | * | 12/2004 | Russek ........................ 707/104.1 |
| 2007/0087798 | A1 | * | 4/2007 | McGucken ................... 463/1 |
| 2008/0306995 | A1 | * | 12/2008 | Newell et al. .............. 707/104.1 |
| 2009/0248399 | A1 | * | 10/2009 | Au .................................. 704/9 |
| 2010/0167819 | A1 | * | 7/2010 | Schell ............................ 463/36 |

FOREIGN PATENT DOCUMENTS

| | | |
|---|---|---|
| JP | 05-100692 | 4/1993 |
| JP | 07-104778 | 4/1995 |
| JP | 2003-233388 | 8/2003 |
| JP | 2003-271174 | 9/2003 |
| JP | 2003-302992 | 10/2003 |
| JP | 2005-181840 | 7/2005 |
| JP | 2006-010845 | 1/2006 |
| JP | 2007-183421 | 7/2007 |
| KR | 10-2008-0060909 | 7/2008 |

* cited by examiner

*Primary Examiner* — Leonard Saint Cyr
(74) *Attorney, Agent, or Firm* — NSIP Law

(57) ABSTRACT

A data processing method and apparatus that may set emotion based on development of a story are provided. The method and apparatus may set emotion without inputting emotion for each sentence of text data. Emotion setting information is generated based on development of the story and the like, and may be applied to the text data.

20 Claims, 9 Drawing Sheets

| TEXT | SPEAKER | BACK GROUND | EMOTION CHANGE OF CHARACTER | TENSION |
|---|---|---|---|---|
| "WHY, BEEZUS," | CHARACTER A | HOUSE | ALARMED, LEVEL 2 | |
| SAID THEIR MOTHER, WHEN SHE SAW THE FLUSHED AND SWEATY FACES OF HER DAUGHTERS, ON ANGRY AND ONE TRIUMPHANT. BEEZUS BLINKED TO HOLD BACK THE TEARS IN HER EYES. | NARRATOR | | | 1 |
| "RAMONA, WHAT HAPPENDED TO BEEZUS?" | CHARACTER A | | ALARMED, LEVEL 3 | |
| MRS. QUIMBY WAS ALARMED. | NARRATOR | | | |
| "DON'T EVER CALL ME BEEZUS AGAIN!" | CHARACTER B | | COMPLAINING, LEVEL 1 | |
| BEEZUS'S VOICE WAS FIERCE. | NARRATOR | | ANGRY, LEVEL 1 | 3 |
| "TELL ME RAMONA" | CHARACTER A | | | |
| MRS. QUIMBY MADE SOUR FACE AND LOOKED AT RAMONA FOR THE EXPLANATION, AND RAMONA WAS EAGER TO GIVE IT. USUALLY BEEZUS WAS THE ONE WHO EXPLAINED WHAT HAD HAPPENED TO RAMONA, HOW SHE HAD DROPPED HER ICE-CREAM CONE ON THE SIDEWALK. | NARRATOR | | | 1 |
| "WELL, WHEN WE WHEN TO THE PARK, I SLIDE ON THE SLIDES AWHILE AND BEEZUS SAT ON A BENCH READING HER LIBRARY BOOK. THEN I SAW AN EMPTY SWING. I CLIMBED UP IN THE SWING, AND I SAID, 'BEE-ZUS, PUSH ME,' AND SOME BIG BOYS, HEAD ME AND ONE OF THEM SAID 'J-J-J'" "HE SAID 'JESUS, BEEZUS!'" | CHARACTER C | | NORMAL | |

METHOD AND APPARATUS FOR PROCESSING DATA

CROSS-REFERENCE TO RELATED APPLICATION(S)

This application claims the benefit under 35 U.S.C. §119(a) of Korean Patent Application No. 10-2009-0076556, filed on Aug. 19, 2009, in the Korean Intellectual Property Office, the entire disclosure of which is incorporated herein by reference for all purposes.

BACKGROUND

1. Field

The following description relates to a data processing method and apparatus, and more particularly, to a text data processing method and apparatus that may be used for natural text-to-speech (TTS) expression.

2. Description of Related Art

Speech synthesis is commonly utilized in a variety of devices, for example, E-books, robots, animation user created contents (UCC), MPEG-1 Audio Layer 3 (MP3) players, and the like. Speech synthesis may be used in a variety of functions, for example, reading a title of a song or a name of a singer based on a human voice in a MP3 player, a function of speaking by a character, a human voice in a real time animation, a function of reading a book in the E-book, and the like.

A device for providing speech synthesis may output a waveform by inputting a text to be spoken. A speech synthesis that expresses emotion may be performed by designating a parameter, such as a type of emotion to be expressed, a speed of reading, a pitch of reading, and the like. Based on these parameters, various emotions, such as delight, sadness, anger, and the like, may be expressible.

Generally, expressing emotion for a plurality of successive sentences using speech synthesis may be possible when contents of the sentences are not excessive. However, when excessive contents are included, or when it is desired to promptly express emotion, a large amount of time may be expended to process text data. Also, when a text-to-speech is performed, it may be difficult to provide an appropriate expression for a situation based on only emotion information.

SUMMARY

In one aspect, provided is a method for processing text data, the method including receiving text data including a story, generating a profile with respect to at least one of a character in the story and a narrator in the story, and generating emotion information corresponding to the story, the emotion information relating to at least one of a profile with respect to a character in the story, a profile with respect to a narrator in the story, emotion change information of a character in the story, and tension information of the story.

The profile with respect to the character may include at least one of a character name, a characteristic of the character, a speech style, a relationship with another character, a speed of speech, an intensity of speech, and a pitch of speech, and the profile with respect to the narrator may include at least one of a narrator name, a speech style, a degree of applying a tension of the story, a speed of speech, an intensity of speech, and a pitch of speech.

The generating of the emotion information may include dividing the story based on a classifying standard, generating speaker information with respect to the text data based on the divided story, and generating at least one of conversation background information corresponding to each division of the story, emotion change information of the character, and tension information of the story.

The classifying standard may be chapter information included in the text data or a classifying standard inputted by a user.

The generating of the speaker information may include analyzing a sentence included in the text data, and generating speaker information based on the analyzed sentence.

The method may further include mapping emotion information corresponding to the story to the text data and storing the mapped information.

In another aspect, provided is an apparatus for storing text data, the apparatus including a text data storing unit to store text data including a story, a profile storing unit to store a profile with respect to at least one of a character in the story and a narrator in the story, and an emotion information storing unit to store emotion information corresponding to the story, the emotion information relating to at least one of a profile with respect to a character in the story, a profile with respect to a narrator in the story, emotion change information of a character in the story, and tension information of the story.

The profile with respect to the character may include at least one of a character name, a characteristic of the character, a speech style, a relationship with another character, a speed of speech, an intensity of speech, and a pitch of speech, and the profile with respect to the narrator may include at least one of a narrator name, a speech style, a degree of applying a tension of the story, a speed of speech, an intensity of speech, and a pitch of speech.

The text data including the story may be divided based on a classifying standard, and the emotion information storing unit may store at least one of conversation background information corresponding to each division of the text data, emotion change information of a character, and tension information of the story.

The classifying standard may be at least one of chapter information included in the text data, a change in a situation where the story is developed, a conversation background in the story, an emotion change of a character, a change in scene of the story, and depth information set to divide the story.

In another aspect, provided is a method for processing text data, the method including loading text data including a story, reading emotion information corresponding to the story, and generating speech setting information to perform a text-to-speech (TTS) transformation based on the emotion information, the emotion information relating to at least one of a profile with respect to a character in the story, a profile with respect to a narrator in the story, emotion change information of a character in the story, tension information of the story, and conversation background information in the story.

When the speaker is a narrator, the reading of the emotion information may include reading the emotion information based on a sentence unit of the text data or a speaker unit, and extracting, from the emotion information, tension information of a current point in time.

When the character is a speaker, the reading of the emotion information may include reading the emotion information based on a sentence unit of the text data or a speaker unit, and extracting, from the emotion change information of the character, emotion information of the character of a current point in time.

The generating of the speech setting information may include setting background music information corresponding to tension information of the story; and setting acoustic effect information corresponding to conversation background information in the story.

The method may further include transforming the text data into speech based on the speech setting information.

In another aspect, provided is an apparatus for processing text data, the apparatus including a text data loading unit to load text data including a story, an emotion information reading unit to read emotion information corresponding to the story, a speech setting information generating unit to generate speech setting information to perform a TTS transformation based on the emotion information, and a TTS transforming unit to transform the text data to speech based on the speech setting information.

The emotion information may be at least one of a profile with respect to a character in the story, a profile with respect to a narrator in the story, emotion change information of a character in the story, tension information of the story, and conversation background information in the story.

The profile with respect to the character may include at least one of a character name, a characteristic of the character, a speech style, a relationship of another character, a speed of speech, an intensity of speech, and a pitch of speech, and the profile with respect to the narrator may include at least one of a narrator name, a speech style, a degree of applying a tension of a story, a speed of speech, an intensity of speech, and a pitch of speech.

The speech setting information may include at least one of background music information corresponding to the tension information of the story or acoustic effect information corresponding to conversation background information in the story.

The speech setting information may include extracting tension information of a current point in time based on a sentence unit of the text data or a speaker unit, and generating speech setting information of the current point in time, from the tension information of the current point in time, wherein, when the tension information of the current point in time does not exist, generating speech setting information of the current point in time based on tension information of a past point in time or a future point in time.

The speech setting information generating unit may generate speech setting information of a current point in time from emotion change information of the character.

Other features and aspects will be apparent from the following description, the drawings, and the claims.

BRIEF DESCRIPTION OF THE DRAWINGS

Throughout the drawings and the description, unless otherwise described, the same drawing reference numerals will be understood to refer to the same elements, features, and structures. The relative size and depiction of these elements may be exaggerated for clarity, illustration, and convenience.

DETAILED DESCRIPTION

The following description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. Also, descriptions of well-known functions and constructions may be omitted for increased clarity and conciseness.

The following description may be applicable to a service of reading contents via a terminal capable of accessing the Internet, for example, an E-book, and MP3 player, a mobile terminal, an animation including a natural emotion expression, and the like.

Figure 1:
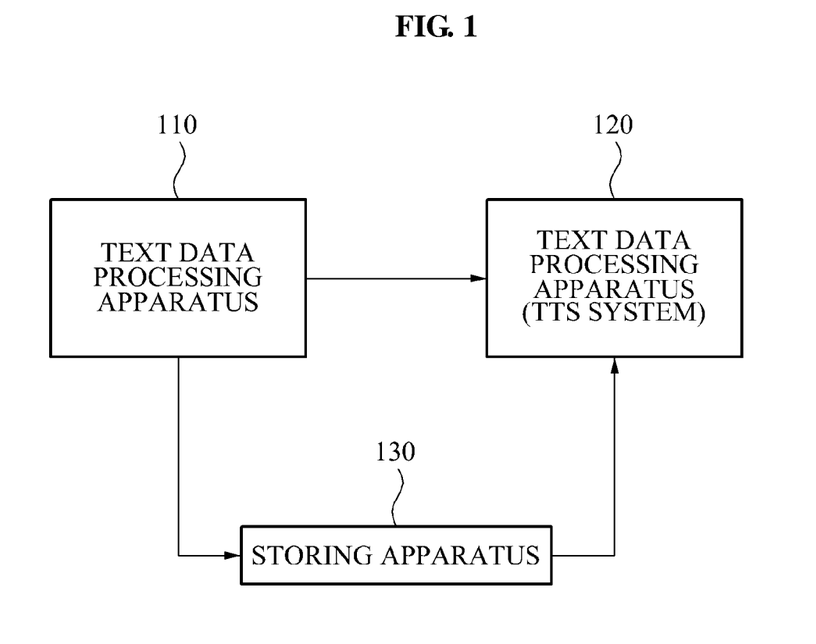
FIG. 1 is a diagram illustrating an example of a text processing apparatus.

FIG. 1 illustrates an example of a text processing apparatus. Referring to FIG. 1, the example text processing apparatus includes a text data processing apparatus 110, a text data processing apparatus including a text-to-speech (TTS) system 120, also referred to as TTS system 120, and a storing apparatus 130.

The text data processing apparatus 110 receives text data. The text data may include various data, for example, a story. The text data processing apparatus 110 may generate emotion information corresponding to the story. The emotion information and the text data may be stored in a storing apparatus 130.

The TTS system 120 includes a text-to-speech (TTS) system to perform a TTS transformation of text data to which emotion information is set. For example, the TTS system 120 may perform TTS transformation of text data stored in the storing apparatus or may perform TTS transformation by receiving, from the text data processing apparatus 110, the text data to which the emotion information is set. The TTS system 120 may be a program module or a hardware device that is capable of performing the TTS transformation through a TTS engine.

The text data processing apparatus 110 may perform a function of a service, and the text data processing apparatus including the TTS system 120 may perform a function of a client or a device.

Figure 2:
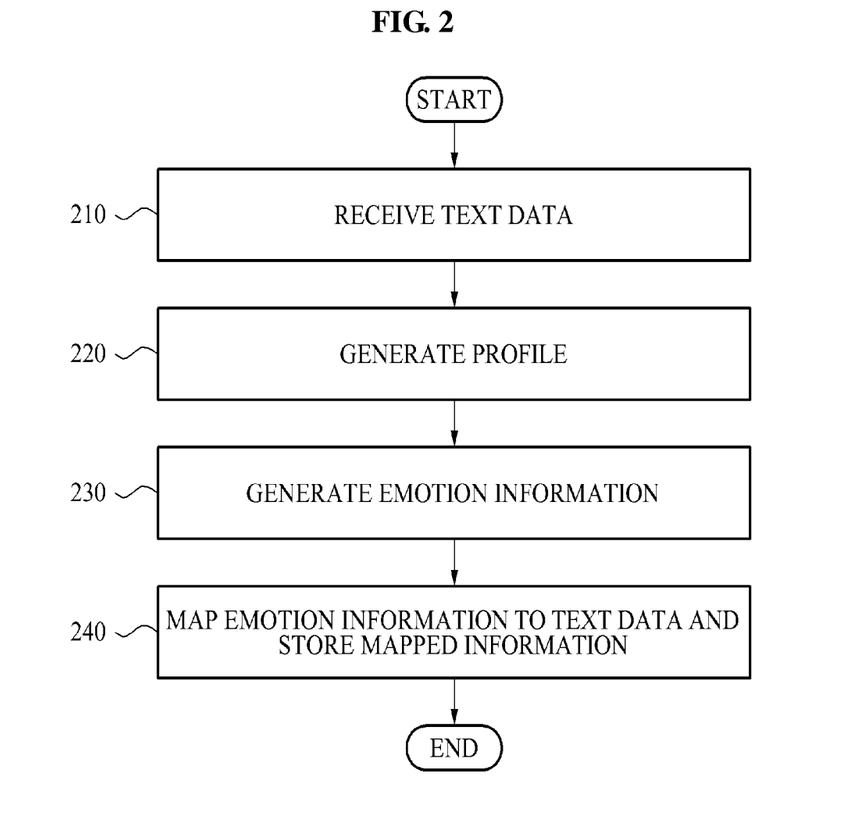
FIG. 2 is a flowchart illustrating an example of a text data processing method.

FIG. 2 illustrates a flowchart of an example text data processing method. The method may be performed, for example, by the text data processing apparatus 110 of FIG. 1.

In 210, the text data processing apparatus 110 receives text data. The data may include, for example, a story. The text data processing apparatus 110 may include a processor to process text data in 210. The text data including the story may be inputted by a user. In some embodiments, the text data may be stored in the storing apparatus 130.

In 220, the text data processing apparatus 110 generates a profile, for example, a profile with respect to a character in the story and/or a narrator in the story. For example, the generation of the profile may be a transformation of information inputted by the user into a form recognized by a computer or the processor.

The narrator profile may include, for example, basic information with respect to the narrator that may be used for telling and reading the story. The narrator profile may include, for example, at least one of a name of the narrator, a speech style, a degree of applying a tension of the story, a speed of speech, an intensity of speech, a pitch of speaking, and the like.

The character profile may, include, for example, basic information with respect to a character which is needed for reading the story. When the story includes a plurality of characters, the character profile may be generated for one or more the characters, for example all of the characters. The character profile may, include, for example, at least one of a name of a character, a characteristic of the character, a speech style, a relationship with another character, a speed of speech, an intensity of speech, a pitch of speech, and the like.

Table 1 illustrates an example of contents of an example narrator profile.

---
Contents of narrator profile
name: a name of a narrator
speech style: being set by defining various styles, such as a descriptive style, a conversation style, a documentary style, and the like, and being changed based on a function of a TTS system
setting a degree of applying a tension: a degree of a change in a pitch of the narrator is set to a level 1, a level 2, . . . and a level n, based on the tension of contents of a story
speed of reading and intensity of reading: speed level 1, 2, and 3, for example, strong tone, medium tone, and light tone

---

Table 2 illustrates an example of contents of an example character profile.

---
Contents of character profile
name: a name of a character
characteristic: a characteristic in a story is selected, and the selection is based on emotion theory
a degree of reflecting emotion: a degree of expressing emotion by speech is set, as emotion is changed
speech style: mainly a conversation style, being set by defining various styles depending on the characteristic or tendency, and being changed based on a function of a TTS system
intimacy or relationship between characters: setting a relationship with another character to which a profile is set
tendency of treating people: setting a conversation style of a conversation with a general character to which a relationship is not set

---

In 230, the text data processing apparatus 110 generates emotion information corresponding to the story. For example, the emotion information may relate to at least one of a profile with respect to the character, a profile with respect to the narrator, emotion change information of the character, tension information of the story, and the like.

In 240, the text data processing apparatus 110 maps the emotion information corresponding to the story to the text data and may store the mapped information.

Figure 3:
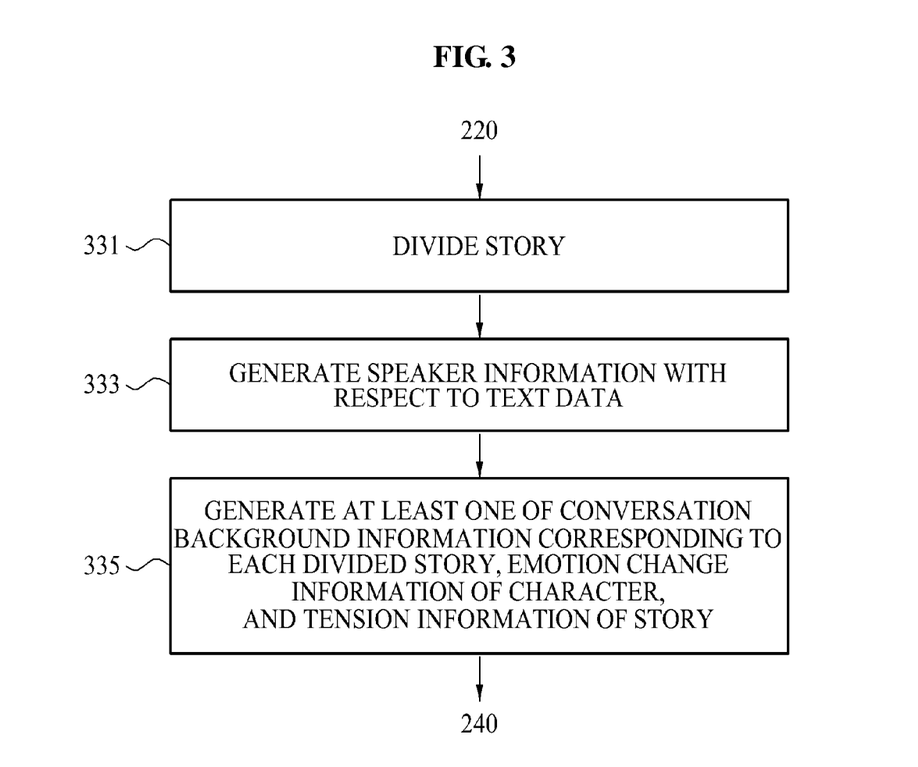
FIG. 3 is a flowchart illustrating an example of a method for generating emotion information.

FIG. 3 illustrates an example flowchart for generating emotion information, for example, the operation of generating emotion information shown in FIG. 2.

In 331, the text data processing apparatus 110 may divide a story into divisions based on a classifying standard. For example, a division of the story may include at least one of a situation of a story, a background of the story, a scene of a story, a chapter of a story, and the like. In some embodiments, the division of the story may be based on a TTS transformation, and may occur when a TTS transformation is performed. The atmosphere and image of each scene may change as the story is developed. Accordingly, when the story is divided based on the situation of the story, emotion appropriate for each scene may be expressed.

For example, the text data processing apparatus 110 may divide the story based on chapter information included in text data or a classifying standard inputted by a user. The text data processing apparatus 110 may automatically divide the story based on a chapter section of the text. The text data processing apparatus 110 may divide the story based on the classifying standard inputted by the user, and may generate identification information to classify each divided story. For example, the classifying standard may include, for example, at least one of a change in a situation where the story is developed, a conversation background in the story, a change in emotion of the character, depth information set for dividing the story, and the like. The identification information to classify a divided story may be generated to be corresponding to a described classifying standard.

In 333, the text data processing apparatus 110 may generate speaker information with respect to the text data. For example, the generation of the speaker information may be transformation of information inputted by the user into a form recognizable to a computer or a processor.

The text data processing apparatus 110 may analyze a sentence included in the text data, and may generate speaker information corresponding to each sentence. For example, the text data processing apparatus 110 may designate a speaker with respect all text as narrator or a character. The text data processing apparatus 110 may designate a speaker with respect to some text as a narrator and a speaker with respect to other text as a narrator. In some embodiments, the text data processing apparatus may exclude a sentence discriminated by using quotation marks (" ").

In 335, the text data processing apparatus 110 may generate at least one of conversation background information corresponding to a divided story, emotion change information of the character, and tension information of the story. For example, the generation of the information may be transformation of information inputted by the user into a form recognizable to the computer or the processor.

The conversation background information may be utilized for a natural speech when a TTS transformation is performed. For example, a TTS transformation system may express a conversation in a quiet library, a conversation in a theater, or a conversation in a noisy road, by referring to the conversation background information. The above described background information is provided merely for example, and is not meant to limit the different background information that may be utilized. In some embodiments, the conversation background information may give an effect on setting of a background acoustic when the TTS transformation is performed.

The tension information may give an effect on speech of the narrator when the TTS transformation is performed. For example, when a tension level is set based on a development of a situation of the story, a speech style of the narrator or an intensity of the speech may be changed during the TTS transformation, based on the tension level set. The tension information may be applied to the entire story or to a portion of the story. For example, the tension information may be set with respect to a portion where a tension increases. The tension information may set a change of a tension over time, and may be designated with respect to contents of a particular text.

The tension information may not need to be designated with respect to all text. For example, when an initial value and a last value of a particular section are designated, a value between the initial value and the last value does not need to be designated. Instead, a value may be generated based on an interpolated value. The interpolated value may be obtained, for example, by interpolating a tension value for text based upon the initial value and the last value.

The emotion change information of a character is information about how to express speech of the character during the TTS transformation. The emotion change information of the character may be applied to a portion of text. In some embodiments, a character profile value may be applied to a portion of text that does not include the emotion change information of the character, during the TTS transformation.

Figure 4:
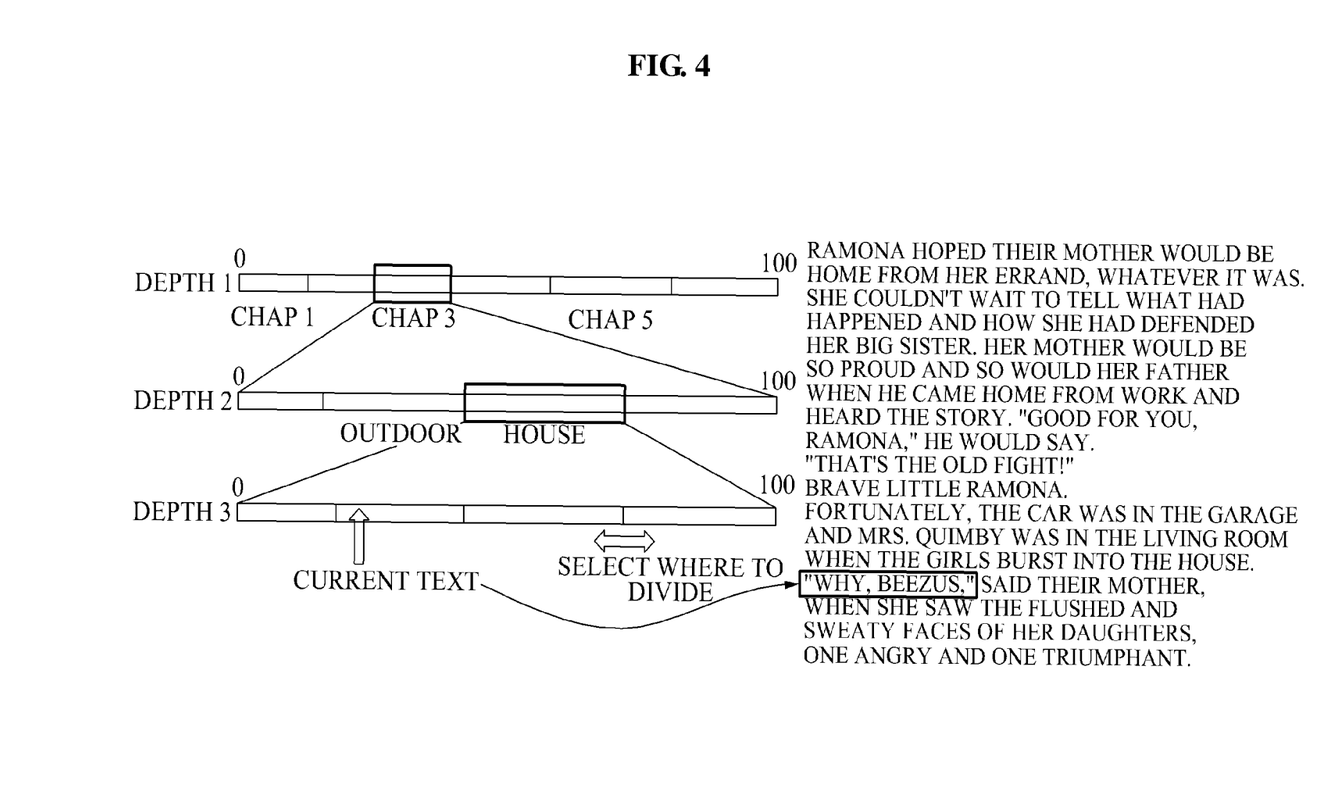
FIG. 4 is a diagram illustrating an example of a process of dividing a story.

FIG. 4 illustrates an example of a process of dividing a story. Referring to FIG. 4, an example of dividing a story based on one or more depths is shown. In this example, depth 1 may discriminate the story based on text data itself, such as a chapter.

Depth 2 is an example of dividing the story based on a conversation background of the story. In this example, the text data processing apparatus 110 may divide the story based on conversation background information inputted by a user, and may generate an identifier to identify a conversation background of each divided story. For example, the identifier to identify the conversation background may be used for expressing a natural speech in the TTS system.

Depth 3 is an example of dividing the text again in a specific conversation background. In this example, the text data processing apparatus 110 may divide the story based on a depth 3 classifying standard, and may generate an identifier to identify a depth 3 section of each division of the divided story. The identifier to identify the depth 3 section may be used for expressing a natural speech in the TTS system.

Figure 5:
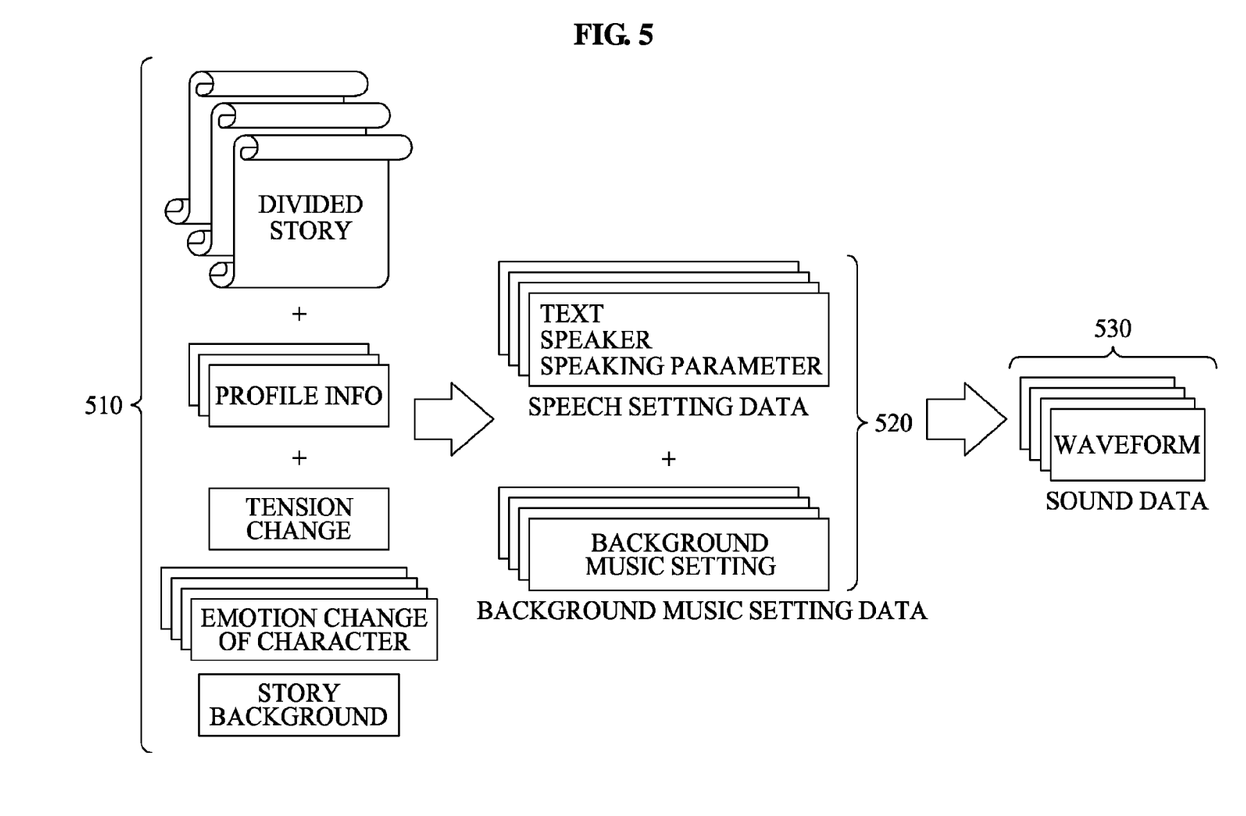
FIG. 5 is a diagram illustrating an example text data processing method.

FIG. 5 illustrates an example of a text data processing method. The text data processing apparatus 110 may generate and store emotion information 510 of text data, speech setting information 520, and sound data 530. The speech setting information 520 and the sound data 530 may be generated and stored by the text data processing apparatus (including the TTS system) 120.

The emotion information 510 of the text data may include at least one of speaker information of the text data, conversation background information, emotion change information of the character, and tension information of the story. The emotion information 510 of the text data may be used as identifiers to discriminate each division of a story, a profile of the character, and a profile of the narrator. In some embodiments, the emotion information 510 of the text data may be corrected by the user.

The speech setting information 520 may include at least one of background music setting data or speech setting data. The speech setting data may include, for example, speaker information matched to each sentence of the text data. Also, the speech setting data may include a parameter to apply the emotion information 510 of the text data to a TTS system 120.

The sound data 530 may be waveform data, and the speech setting information 520 may be outputted from the TTS system 120.

Figure 6:
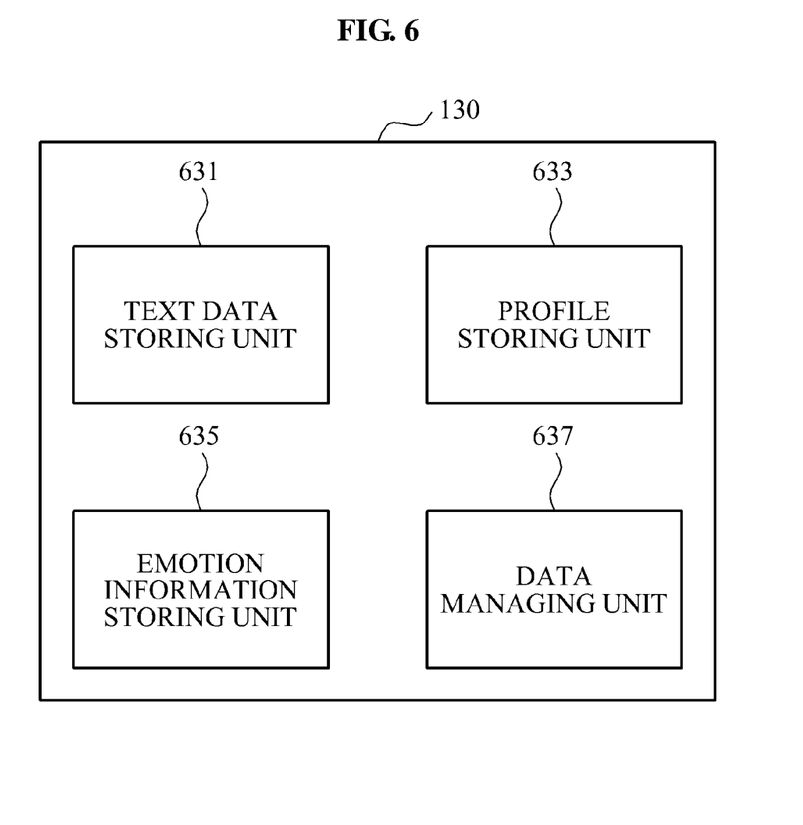
FIG. 6 is a diagram illustrating an example of a storing apparatus that may be included in the text processing apparatus of FIG. 1.

FIG. 6 illustrates an example of a storing apparatus that may be used in the text processing apparatus of FIG. 1. The storing apparatus 130 may be a portable storage medium. In some embodiments, the storing apparatus 130 may be included in the text data processing apparatus 110 or the text data processing apparatus 120. In the example shown in FIG. 6, the storing apparatus 130 includes a text data storing unit 631, a profile storing unit 633, emotion information storing unit 635, and a data managing unit 637.

The text data storing unit 631 stores text data including a story. The text data may be stored in a divided condition based on a classifying standard. For example, the classifying standard may be at least one of chapter information included in the text data, a change in a situation where the story is developed, a conversation background of the story, an emotion change of a character, depth information set for dividing the story, a chapter, a scene, and the like.

The profile storing unit 633 stores profile information, for example, a profile of at least one character in the story, a profile of at least one narrator in the story, or a combination thereof. The profile of the character may include, for example, at least one a character name, a characteristic of the character, a speech style, a relationship with another character, a speed of speech, an intensity of speech, a pitch of speech, and the like. The profile of the narrator may include, for example, at least one of a narrator name, a speech style, a degree of applying tension of the story, a speed of speech, an intensity of speech, a pitch of speech, and the like.

The emotion information storing unit 635 stores emotion information corresponding to the story. The emotion information may relate to, for example, at least one of the profile of a character, the profile of a narrator, emotion change information of the character, tension information of the story, and the like. The emotion information storing unit 635 may store, for example, at least one of the conversation background information corresponding to the divided text data, the emotion change information of the character, the tension information of the story, and the like.

The data managing unit 637 may be connected with an external device, and may perform a controlling operation to input/output data stored in the storing apparatus 130.

Figure 7:
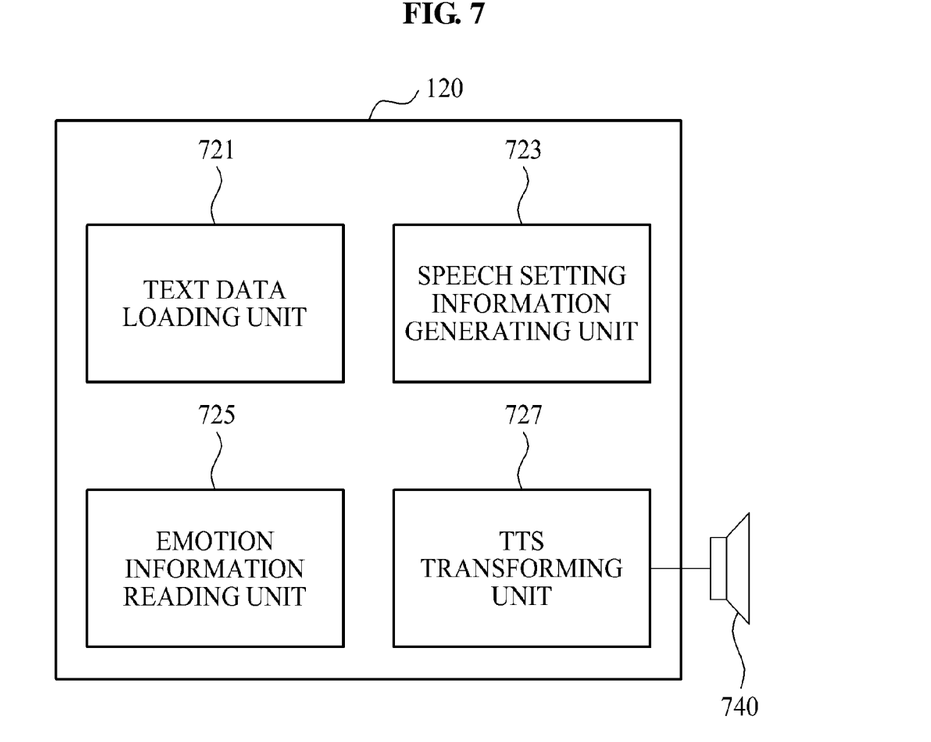
FIG. 7 is a diagram illustrating an example of a text data processing apparatus that may be included in the text processing apparatus of FIG. 1.

FIG. 7 illustrates an example of a text data processing apparatus that may be used in the text processing apparatus of FIG. 1. The example text data processing apparatus 120 may include a text data loading unit 721, a speech setting information generating unit 723, an emotion information reading unit 725, and a TTS transforming unit 727. The TTS transforming unit 727 may be connected with a sound outputting apparatus, such as a speaker, and the like.

The text data loading unit 721 loads text data including a story. The speech setting information generating unit 723 generates speech setting information for TTS transformation, based on emotion information. For example, the speech setting information may include at least one of background music information corresponding to the tension information of the story and acoustic effect information corresponding to the conversation background information of the story.

The speech setting information generating unit 723 may extract tension information of a current point in a time based on a sentence unit of the text data or based on a speaker unit, and may generate speech setting information of the current point in time from the tension information of the current point in time. When the tension information of the current point in time does not exist, the speech setting information of the current point in time may be generated based on tension information of a past point in time and/or a future point in time. For example, the speech setting information generating unit 723 may generate the tension information of the current point in time as a level 3 when the tension information of the past point in time is level 2. In this example, the "current point in time" indicates a sentence currently inputted to the speech setting information generating unit 723 or text data currently inputted to the speech setting information generating unit 723.

The speech setting information generating unit 723 may generate speech setting information of the current point in time from emotion change information of a character. For example, the emotion change information of the character may be classified into "angry," "grumpy," "happy," "normal," and the like, and may be classified based on a numeric value. When the emotion change information of the character does not exist, the speech setting information generating unit 723 may generate the speech setting information of the current point in time based on emotion change information of the character with respect to a past point in time and/or a future point in time.

The emotion information reading unit 725 reads emotion information corresponding to the story. For example, the emotion information may include at least one of a profile with respect to the character in the story, a profile with respect to a narrator in the story, emotion change information of the character, tension information of the story, conversation background information of the story, and the like.

TTS transforming unit 727 may transform the text data into speech based on speech setting information.

Figure 8:
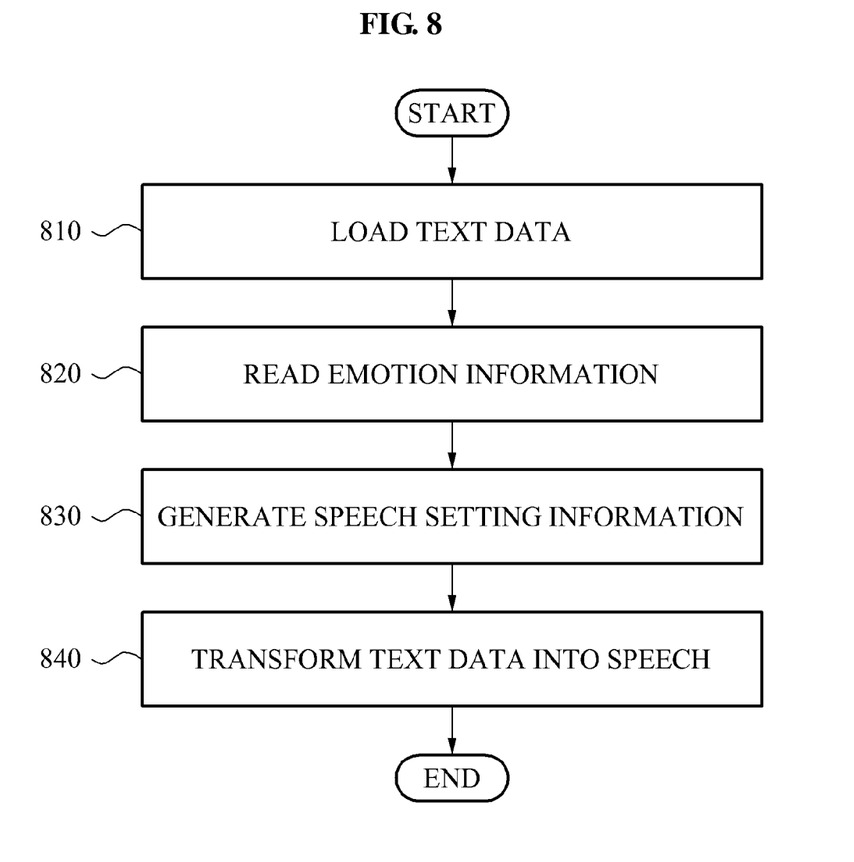
FIG. 8 is a flowchart illustrating an example of a text data processing method.

FIG. 8 illustrates an example of a text data processing method. The text data processing method of FIG. 8 may be performed by a text data processing apparatus including a processor or a text data processing apparatus that includes a TTS system.

In 810, the text data processing apparatus performs loading text data including a story. In 810, the text data processing apparatus may check an environment or a performance of the TTS system to determine, for example, a number of speakers that the TTS system is able to support, a degree of emotion expression that the TTS system is able to support, an acoustic effect that the TTS system is able to support, and the like. The text data processing apparatus may generate speech setting information based on the environment or performance of the TTS system. For example, when performance of the TTS system supports only one narrator, all narration may be spoken by the one narrator even though two or more narrator profiles exist.

In some embodiments, a user of the text data processing apparatus may change or select a speaker as desired by the user. For example, when two characters are in the story, the user or the text data processing apparatus may designate a first character as a speaker A and may designate a second character as a speaker B. The number of characters in the story may be known by each character profile.

In 820, the text data processing apparatus may read emotion information corresponding to the story. For example, the text data processing apparatus may read the emotion information based on a sentence unit of text data or a speaker unit, and may extract tension information of a current point in time from the emotion information, when the speaker is the narrator.

For example, the text data processing apparatus may extract emotion information of a character of the current point in time, from the emotion change information of the character, when the speaker is the character.

In 830, the text data processing apparatus may generate the speech setting information for TTS transformation based on the emotion information. The text data processing apparatus may interpolate prior tension information and posterior tension information to generate tension information with respect to a current text, when tension information set on the current text does not exist. The tension information may be used as the speech setting information to perform speech of the current text according to "a degree of applying tension" defined in the narrator profile.

In this example, the text data processing apparatus may extract emotion information of a character with respect to a current point in time from the emotion change information of the character, when the speaker is the character. The text data processing apparatus may generate the speech setting information to perform speech of the current text using at least one of emotion of the character at the current point in time, a numeric value of emotion, conversation background information, and the like.

When the current text does not include a set emotion, the text data processing apparatus may generate the speech setting information using a basic conversation tendency and/or an intimacy and/or relationship with another character set in the character profile. In some embodiments, the speech setting information may be generated using a currently set emotion and a numeric value, when the current text includes a set emotion. When the numeric value does not exist, a prior emotion value and a posterior emotion value may be interpolated and the speech setting information may be generated based on the interpolation. For example, the interpolation may be performed using a degree of a change in the emotion according to a situation, and a characteristic of the character.

The text data processing apparatus may generate various speech setting information of the character according to the conversation background information of the current point in time. For example, when the conversation speech setting information of the current point in time is a library, the text data processing apparatus may generate the speech setting information to output speech of the character quietly.

In 830, the text data processing apparatus may set background music information corresponding to tension information of the story, and may set acoustic effect corresponding to conversation background information of the story.

In 840, the text data processing apparatus may transform text data into speech based on the speech setting information.

Figure 9:
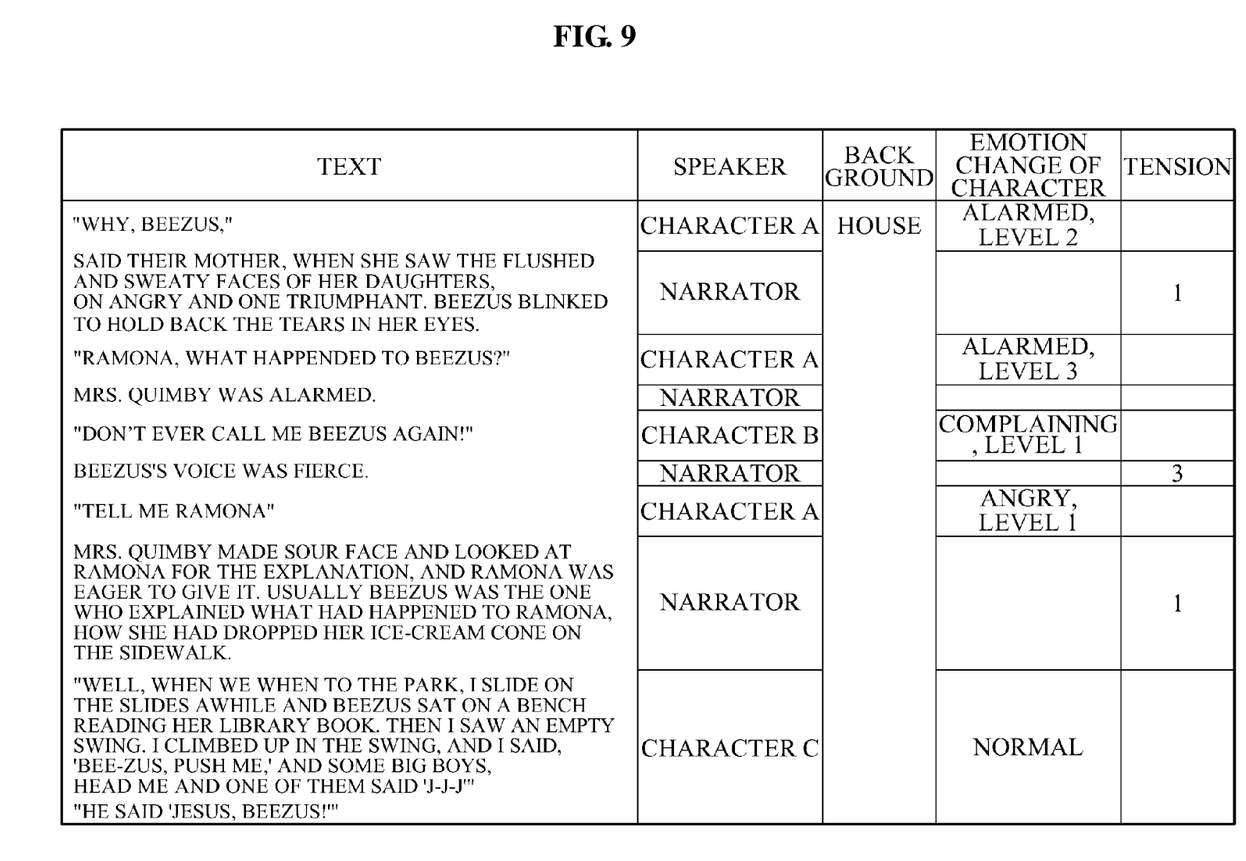
FIG. 9 is a diagram illustrating an example of an operation for generating speech to setting information.

FIG. 9 illustrates an example of an operation of generating speech setting information. FIG. 9 illustrates text data, a parameter indicating a speaker, a parameter indicating a conversation background, a parameter indicating a character emotion change, and a parameter indicating a tension of a story.

Referring to FIG. 9, the parameter indicating the speaker is shown for each sentence. The parameter indicating the conversation background may be set to, for example, "house". Accordingly, a text data processing apparatus may output acoustic effect corresponding to the "house", as a sound.

The emotion change of a character may include, for example, emotions that include "alarmed," "complaining," "angry," "normal," and the like. In this example, the emotion change of character A is changed from "alarmed, level 2" to "alarmed, level 3." Accordingly, the text data processing apparatus may distinguish between "alarmed, level 2" and "alarmed, level 3," and may output speech differently based upon the different level.

In this example, the parameter indicating the tension is expressed with a numeric value. Accordingly, the text data processing apparatus may output speech of a narrator differently based on the numeric value of the parameter indicating the tension.

Also, a user may correct a character profile or a narrator profile, and may operate a TTS system as desired by the user. That is, the user may change a degree of applying a tension of the narrator profile, and thus, may freely change a speech effect of the story. Also, the user may change emotion change information of the character, and thus, may change speech of the character as desired by the user.

Emotion setting information may be generated based on the development of a story and the like, when emotion is applied to the text data, and thus, emotion may be easily and quickly applied to the text data.

Text-to-speech (TTS) is naturally embodied based on various emotion information. A parameter for TTS transformation may be stored based on a background of a story, a change in an emotion of a character, a change in a tension of the story, and the like. Accordingly, a small amount of data may be stored compared with a case of storing a parameter for each sentence.

The processes, functions, methods and/or software according to the above-described examples may be recorded, stored, or fixed in one or more computer-readable storage media that includes program instructions to be implemented by a computer to cause a processor to execute or perform the program instructions. The media may also include, alone or in combination with the program instructions, data files, data structures, and the like. The media and program instructions may be those specially designed and constructed, or they may be of the kind well-known and available to those having skill in the computer software arts. Examples of computer-readable storage media include magnetic media such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described example embodiments, or vice versa. In addition, a computer-readable storage medium may be distributed among computer systems connected through a network and computer-readable codes or program instructions may be stored and executed in a decentralized manner.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A method for processing text data, the method comprising:
   receiving, at a processor, text data including a story;
   generating, at the processor, a character profile with respect to a character in the story;
   generating, at the processor, a narrator profile with respect to a narrator in the story; and
   generating, at the processor, emotion information corresponding to development of a situation of the story, the emotion information relating to the character profile, the narrator profile, emotion change information of a character in the story, and tension information of the story;
   wherein the character profile includes a character name, a characteristic of the character, a speech style being changed based on a function of a text-to-speech (TTS) system, a relationship with another character, a speed of speech, an intensity of speech, and a pitch of speech, and
   wherein the narrator profile includes a narrator name, a speech style being changed based on a function of a text-to-speech (TTS) system, a degree of applying a tension of the story, a speed of speech, an intensity of speech, and a pitch of speech.

2. The method of claim 1, wherein the generating of the emotion information comprises:
   dividing the story based on a classifying standard;
   generating speaker information with respect to the text data based on the divided story; and
   generating at least one of conversation background information corresponding to each division of the story, emotion change information of the character, and tension information of the story.

3. The method of claim 2, wherein the classifying standard is chapter information included in the text data or a classifying standard inputted by a user.

4. The method of claim 2, wherein the generating of the speaker information comprises:
   analyzing a sentence included in the text data; and
   generating speaker information based on the analyzed sentence.

5. The method of claim 1, further comprising:
   mapping emotion information corresponding to the story to the text data and storing the mapped information.

6. An apparatus for storing text data, the apparatus comprising:
   a text data storing unit configured to store text data including a story;
   a character profile storing unit configured to store a character profile with respect to a character in the story and a narrator profile with respect to a narrator in the story; and
   an emotion information storing unit configured to store emotion information corresponding to development of a situation of the story, the emotion information relating to the character profile, the narrator profile, emotion change information of a character in the story, and tension information of the story;
   wherein the character profile includes a character name, a characteristic of the character, a speech style being changed based on a function of a text-to-speech (TTS) system, a relationship with another character, a speed of speech, an intensity of speech, and a pitch of speech, and
   wherein the narrator profile includes a narrator name, a speech style being changed based on a function of a text-to-speech (TTS) system, a degree of applying a tension of the story, a speed of speech, an intensity of speech, and a pitch of speech.

7. The apparatus of claim 6, wherein the text data including the story is divided based on a classifying standard, and the emotion information storing unit stores at least one of conversation background information corresponding to each division of the text data, emotion change information of a character, and tension information of the story.

8. The apparatus of claim 7, wherein the classifying standard is at least one of chapter information included in the text data, a change in a situation where the story is developed, a conversation background in the story, an emotion change of a character, a change in scene of the story, and depth information set to divide the story.

9. A method for processing text data, the method comprising:
   loading, at a processor, text data including a story;
   reading, at the processor, emotion information corresponding to development of a situation of the story; and
   generating, at the processor, speech setting information to perform a text-to-speech (TTS) transformation based on the emotion information, the emotion information relating to a character profile with respect to a character in the story, a narrator profile with respect to a narrator in the story, emotion change information of a character in the story, tension information of the story, and conversation background information in the story;
   wherein the character profile includes a character name, a characteristic of the character, a speech style being changed based on a function of a text-to-speech (TTS) system, a relationship with another character, a speed of speech, an intensity of speech, and a pitch of speech, and
wherein the narrator profile includes a narrator name, a speech style being changed based on a function of a text-to-speech (TTS) system, a degree of applying a tension of the story, a speed of speech, an intensity of speech, and a pitch of speech.

10. The method of claim 9, wherein, when the speaker is a narrator, the reading of the emotion information comprises:
reading the emotion information based on a sentence unit of the text data or a speaker unit; and
extracting, from the emotion information, tension information of a current point in time.

11. The method of claim 9, wherein, when the character is a speaker, the reading of the emotion information comprises:
reading the emotion information based on a sentence unit of the text data or a speaker unit; and
extracting, from the emotion change information of the character, emotion information of the character of a current point in time.

12. The method of claim 9, wherein the generating of the speech setting information comprises:
setting background music information corresponding to tension information of the story; and
setting acoustic effect information corresponding to conversation background information in the story.

13. The method of claim 9, further comprising:
transforming the text data into speech based on the speech setting information.

14. An apparatus for processing text data, the apparatus comprising:
a text data loading unit configured to load text data including a story;
an emotion information reading unit configured to read emotion information corresponding to development of a situation of the story;
a speech setting information generating unit configured to generate speech setting information to perform a text-to-speech (TTS) transformation based on the emotion information; and
a TTS transforming unit configured to transform the text data to speech based on the speech setting information,
wherein the emotion information corresponding to a character profile with respect to a character in the story, a narrator profile with respect to a narrator in the story, emotion change information of a character in the story, tension information of the story, and conversation background information in the story;
wherein the character profile includes a character name, a characteristic of the character, a speech style being changed based on a function of a text-to-speech (TTS) system, a relationship with another character, a speed of speech, an intensity of speech, and a pitch of speech, and
wherein the narrator profile includes a narrator name, a speech style being changed based on a function of a text-to-speech (TTS) system, a degree of applying a tension of the story, a speed of speech, an intensity of speech, and a pitch of speech.

15. The apparatus of claim 14, wherein the profile with respect to the character includes at least one of a character name, a characteristic of the character, a speech style, a relationship of another character, a speed of speech, an intensity of speech, and a pitch of speech, and the profile with respect to the narrator includes at least one of a narrator name, a speech style, a degree of applying a tension of a story, a speed of speech, an intensity of speech, and a pitch of speech.

16. The apparatus of claim 14, wherein the speech setting information includes at least one of background music information corresponding to the tension information of the story or acoustic effect information corresponding to conversation background information in the story.

17. The apparatus of claim 14, wherein the speech setting information comprises:
extracting tension information of a current point in time based on a sentence unit of the text data or a speaker unit; and
generating speech setting information of the current point in time, from the tension information of the current point in time,
wherein, when the tension information of the current point in time does not exist, generating speech setting information of the current point in time based on tension information of a past point in time or a future point in time.

18. The apparatus of claim 14, wherein the speech setting information generating unit generates speech setting information of a current point in time from emotion change information of the character.

19. A non-transitory computer program embodied on a computer readable storage medium, the computer program being configured to control a processor to perform:
receiving text data including a story;
generating a character profile with respect to a character in the story;
generating, at the processor, a narrator profile with respect to a narrator in the story; and
generating emotion information corresponding to the story, the emotion information relating to the character profile, the narrator profile, emotion change information of a character in the story, and tension information of the story;
wherein the character profile includes a character name, a characteristic of the character, a speech style being changed based on a function of a text-to-speech (TTS) system, a relationship with another character, a speed of speech, an intensity of speech, and a pitch of speech, and
wherein the narrator profile includes a narrator name, a speech style being changed based on a function of a text-to-speech (TTS) system, a degree of applying a tension of the story, a speed of speech, an intensity of speech, and a pitch of speech.

20. A non-transitory computer program embodied on a computer readable storage medium, the computer program being configured to control a processor to perform:
loading text data including a story;
reading emotion information corresponding to the story; and
generating speech setting information to perform a text-to-speech (TTS) transformation based on the emotion information, the emotion information relating to a character profile with respect to a character in the story, a narrator profile with respect to a narrator in the story, emotion change information of a character in the story, tension information of the story, and conversation background information in the story;
wherein the character profile includes a character name, a characteristic of the character, a speech style being changed based on a function of a text-to-speech (TTS) system, a relationship with another character, a speed of speech, an intensity of speech, and a pitch of speech, and
wherein the narrator profile includes a narrator name, a speech style being changed based on a function of a text-to-speech (TTS) system, a degree of applying a tension of the story, a speed of speech, an intensity of speech, and a pitch of speech.

* * * * *